United States Patent
Chun et al.

(10) Patent No.: US 10,239,408 B2
(45) Date of Patent: Mar. 26, 2019

(54) APPARATUS AND METHOD FOR CONTROLLING LOW VOLTAGE DIRECT CURRENT CONVERTER FOR ECO-FRIENDLY VEHICLE

(71) Applicant: HYUNDAI MOTOR COMPANY, Seoul (KR)

(72) Inventors: Shin Hye Chun, Gwangyang-si (KR); Hyun Wook Seong, Hwaseong-si (KR); Hui Sung Jang, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 214 days.

(21) Appl. No.: 15/218,796

(22) Filed: Jul. 25, 2016

(65) Prior Publication Data

US 2017/0151877 A1 Jun. 1, 2017

(30) Foreign Application Priority Data

Dec. 1, 2015 (KR) .................. 10-2015-0169977

(51) Int. Cl.
*B60L 11/18* (2006.01)
*B60L 1/00* (2006.01)
(Continued)

(52) U.S. Cl.
CPC ............. *B60L 11/1811* (2013.01); *B60L 1/00* (2013.01); *B60L 15/007* (2013.01);
(Continued)

(58) Field of Classification Search
CPC .. H02M 3/33546; H02M 3/3376; H02M 1/08; H02M 1/14; H02M 3/28
(Continued)

(56) References Cited

U.S. PATENT DOCUMENTS 8,319,570 B2 * 11/2012 Wilson .................... H03F 3/217
323/283
2009/0160416 A1 6/2009 Kawagishi et al.

FOREIGN PATENT DOCUMENTS

JP 2004-040856 A 2/2004
JP 2009-153289 A 7/2009
(Continued)

OTHER PUBLICATIONS

Woo Ju Jung and Joong Ho Choi, "A Study on Adaptive Slope Compensation Circuit for Current Mode DCDC converters", The Institute of Electronics Engineers of Korea, The Magazine of the IEEK, vol. 37, No. 8, pp. 86-94, Aug. 2010. (w/ English abstract).
(Continued)

*Primary Examiner* — John W Poos
(74) *Attorney, Agent, or Firm* — Morgan Lewis & Bockius LLP

(57) ABSTRACT

An apparatus for controlling a low voltage direct current (DC)-DC converter (LDC) for an eco-friendly vehicle includes a reference current receiver for receiving a reference current, a ramp signal generator for generating a ramp signal by overlapping an input current of the LDC, and a DC offset and a sawtooth wave for adjusting a gradient of the ramp signal, and a comparator for generating a pulse width modulation (PWM) signal using the reference current received by the reference current receiver and the ramp signal generated by the ramp signal generator.

7 Claims, 5 Drawing Sheets

(51) Int. Cl.
*B60L 15/00* (2006.01)
*H02M 3/335* (2006.01)
*H02M 3/337* (2006.01)

(52) U.S. Cl.
CPC ..... *H02M 3/3376* (2013.01); *H02M 3/33546* (2013.01); *B60L 2210/12* (2013.01); *B60L 2240/526* (2013.01); *B60L 2240/527* (2013.01)

(58) Field of Classification Search
USPC ................ 327/172, 173, 174, 175; 307/10.1
See application file for complete search history.

(56) References Cited

FOREIGN PATENT DOCUMENTS

| | | |
|---|---|---|
| JP | 2013-247574 A | 12/2013 |
| KR | 10-1090701 B1 | 12/2011 |

OTHER PUBLICATIONS

Korean Office Action dated Jan. 11, 2017, issued in Korean patent application No. 10-2015-0169977.

* cited by examiner

APPARATUS AND METHOD FOR CONTROLLING LOW VOLTAGE DIRECT CURRENT CONVERTER FOR ECO-FRIENDLY VEHICLE

CROSS-REFERENCE TO RELATED APPLICATION

This application claims the benefit of priority to Korean Patent Application No. 10-2015-0169977, filed on Dec. 1, 2015 with the Korean Intellectual Property Office, the disclosure of which is incorporated herein in its entirety by reference.

TECHNICAL FIELD

The present disclosure relates to an apparatus and a method for controlling a low voltage direct current (DC)-DC converter (LDC) for an eco-friendly vehicle, and more particularly, to a technology capable of improving current control response characteristics (control performance) of a low voltage DC-DC converter (LDC) even in a low load environment by dualizing a gradient of a ramp signal used to generate a pulse width modulation (PWM) signal for controlling the LDC of an eco-friendly vehicle.

BACKGROUND

An eco-friendly vehicle may include a high voltage battery for supplying driving power, and an auxiliary battery for supplying power to electronic loads. Here, a low voltage DC-DC converter (LDC) connected to the auxiliary battery and the electronic loads may down-convert a voltage of the high voltage battery when a voltage of the auxiliary battery does not exceed a reference value under a control of an upper controller, thereby charging the auxiliary battery with the down-converted voltage.

In the LDC according to the related art, a gradient of a ramp signal used to generate a pulse width modulation (PWM) signal for controlling the LDC of the eco-friendly vehicle is unified. When a voltage reference is lower than a charging voltage of the auxiliary battery, the LDC may enter a current discontinuous mode in which current control response characteristics are slower. As a result, there are problems in that it may be impossible to perform a zero voltage switching (ZVS), which causes switching losses, an output ripple is deteriorated, and noise is caused in components of a type of core (e.g., a transformer, an inductor, etc.).

SUMMARY

The present disclosure has been made to solve the above-mentioned problems occurring in the prior art while advantages achieved by the prior art are maintained intact.

An aspect of the present disclosure provides an apparatus and a method for controlling a low voltage direct current (DC)-DC converter (LDC) for an eco-friendly vehicle capable of improving current control response characteristics (control performance) of the LDC even in a low load environment by sharply adjusting (adjusting a gradient of a ramp signal to a first value) a gradient of a ramp signal used to generate a pulse width modulation (PWM) signal for controlling the LDC of the eco-friendly vehicle in a reference duty or less (a current discontinuous mode), and slowly adjusting (adjusting the gradient of the ramp signal to a second value) the gradient of the ramp signal in more than the reference duty (a current continuous mode).

The objects of the present disclosure are not limited to the above-mentioned objects, and other objects and advantages of the present disclosure can be appreciated by the following description and will be clearly described by the exemplary embodiments of the present disclosure. Further, it will be easily known that the objects and advantages of the present disclosure can be implemented by means shown in the appended claims and a combination thereof.

According to an exemplary embodiment of the present disclosure, an apparatus for controlling a low voltage direct current (DC)-DC converter (LDC) for an eco-friendly vehicle may include a reference current receiver for receiving a reference current; a ramp signal generator for generating a ramp signal by overlapping an input current of the LDC, and a DC offset and a sawtooth wave for adjusting a gradient of the ramp signal; and a comparator for generating a pulse width modulation (PWM) signal using the reference current received by the reference current receiver and the ramp signal generated by the ramp signal generator.

According to another exemplary embodiment of the present disclosure, a method for controlling a low voltage direct current (DC)-DC converter (LDC) for an eco-friendly vehicle may include receiving, by a reference current receiver, a reference current; generating, by a ramp signal generator, a ramp signal by overlapping an input current of the LDC, and a DC offset and a sawtooth wave for adjusting a gradient of the ramp signal; and generating, by a comparator, a pulse width modulation (PWM) signal using the reference current received by the reference current receiver and the ramp signal generated by the ramp signal generator.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The above-mentioned objects, features, and advantages will become obvious from the detailed description described below with reference to the accompanying drawings. Therefore, those skilled in the art to which the present disclosure pertains may easily practice technical concepts of the present disclosure. Further, in describing the present disclosure, in the case in which it is judged that a detailed description of a well-known technology associated with the present disclosure may unnecessarily make the concepts of the present disclosure unclear, such a description will be omitted. Hereinafter, exemplary embodiments of the present disclosure will be described in detail with reference to the accompanying drawings.

Figure 1:
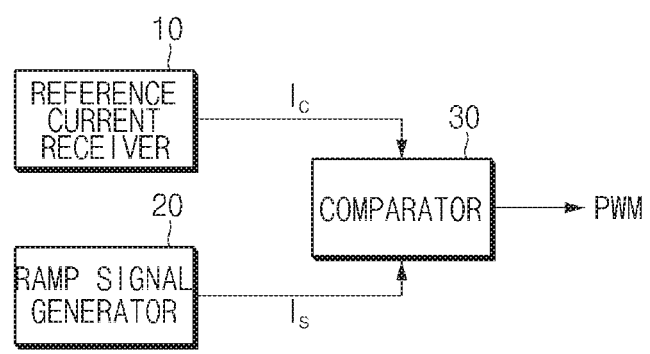
FIG. 1 is a configuration diagram of an apparatus for controlling a low voltage DC-DC converter (LDC) for an eco-friendly according to an embodiment of the present disclosure.

FIG. 1 is a configuration diagram of an apparatus for controlling a low voltage DC-DC converter (LDC) for an eco-friendly vehicle according to an embodiment of the present disclosure. The LDC will be described by way of example.

As illustrated in FIG. 1, the apparatus for controlling the LDC for an eco-friendly vehicle according to an exemplary embodiment of the present disclosure may include a reference current receiver 10, a ramp signal generator 20 and a comparator 30.

Each of the above-mentioned components will be described. First, the reference current receiver 10 may receive a current reference as a reference current.

Next, the ramp signal generator 20 may generate a ramp signal by overlapping an input current, a DC offset and a sawtooth wave (a sawtooth signal).

The input current may be a current which is input to the LDC, and specifically may mean a current flowing in a primary side of a transformer within the LDC. Further, the DC offset may serve to increase a gradient value of the ramp signal in a section in which a duty of the PWM signal is a reference value or less, that is, a section in which the LDC is operated in a current discontinuous mode. Further, a gradient of the sawtooth wave may be set to be 0.5 times or more of a gradient of a current ($I_{Lo}$ in FIG. 3) flowing in an output inductor in the LDC in order to prevent radiation of the LDC. In this case, the reference value may be determined by an input voltage and an output voltage of the LDC, and a transformer turn ratio (a step-down ratio).

Figure 4:
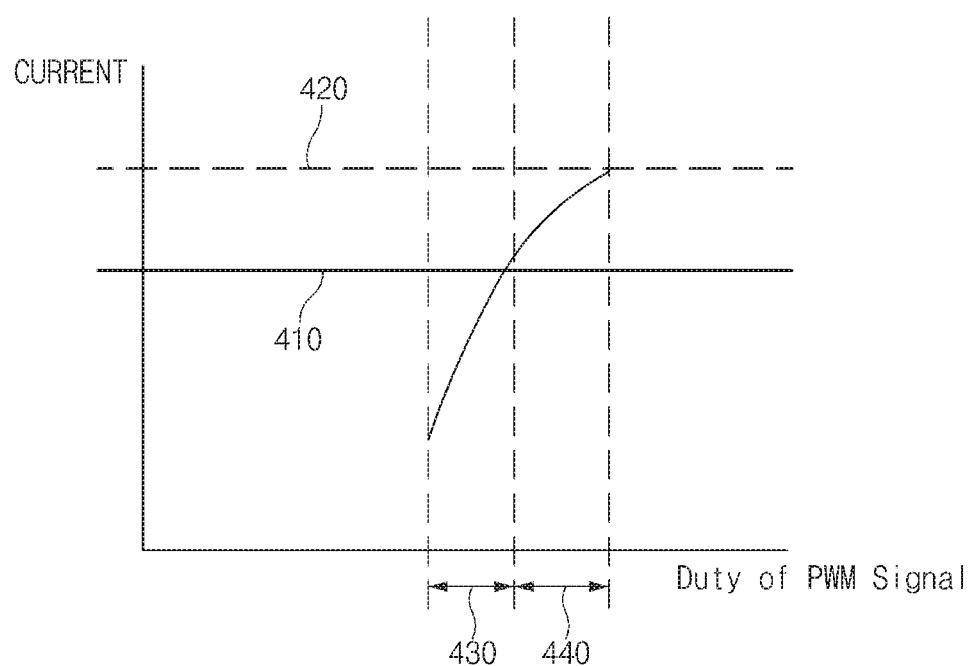
FIG. 4 is a diagram illustrating an operation result of an apparatus for controlling a low voltage DC-DC converter for an eco-friendly vehicle according to an embodiment of the present disclosure.

The ramp signal generator 20 may generate a ramp signal having a gradient of a first value in a section 430 in which the duty of the PWM signal is the reference value or less, and the ramp signal generator 20 may generate a ramp signal having a gradient of a second value in a section 440 in which the duty of the PWM signal exceeds the reference value, as illustrated in FIG. 4. In this case, the first value may be a value greater than the second value.

Next, the comparator 30, which may be a peak current comparator, may generate the PWM signal using the reference current $I_c$ received by the reference current receiver 10, and the ramp signal Is generated by the ramp signal generator 20. That is, the comparator 30 may generate the PWM signal by determining "1" when the ramp signal generated by the ramp signal generator 20 exceeds the reference current received by the reference current receiver 10, and determining "0" when the ramp signal generated by the ramp signal generator 20 does not exceed the reference current received by the reference current receiver 10.

Each of the above-mentioned components may be controlled by a controller (not illustrated), and the controller may perform a general control so that the respective components may normally perform their above-listed, or other, functions.

Hereinafter, a structure of a ramp signal generator 20 will be described in detail with reference to FIG. 2.

Figure 2:
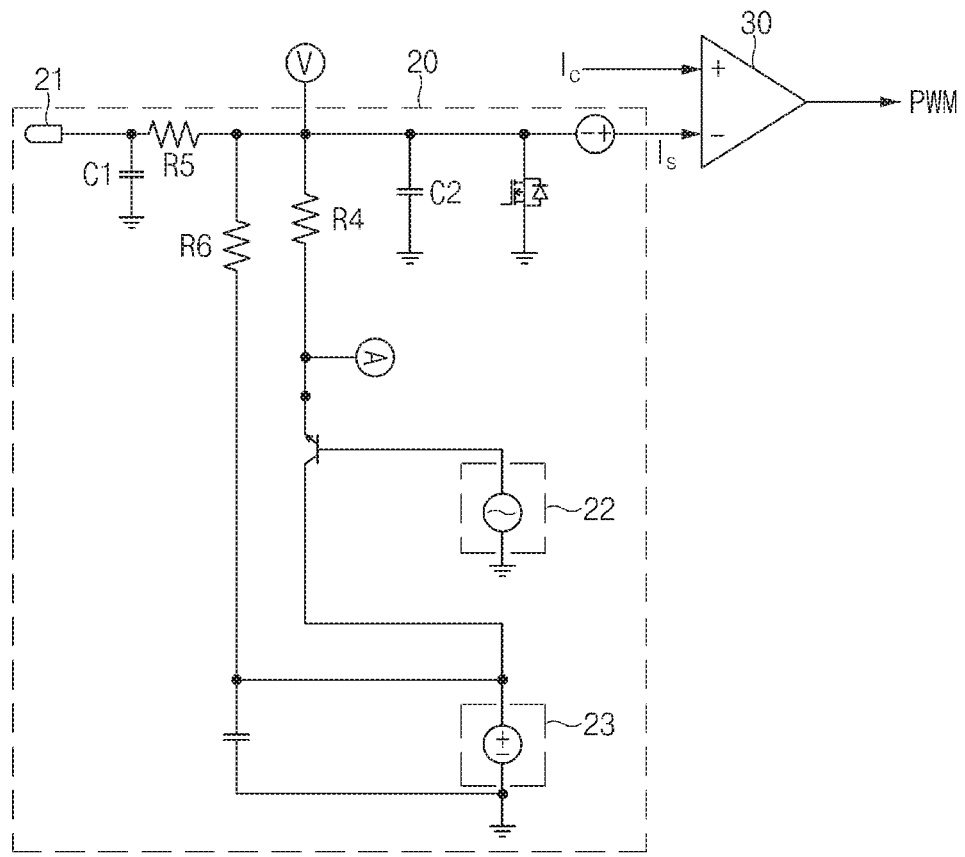
FIG. 2 is a circuit diagram of an apparatus for controlling a low voltage DC-DC converter (LDC) for an eco-friendly vehicle according to an embodiment of the present disclosure.

FIG. 2 is a circuit diagram of an apparatus for controlling a low voltage DC-DC converter (LDC) for an eco-friendly vehicle according to an exemplary embodiment of the present disclosure.

As illustrated in FIG. 2, the ramp signal generator 20 according to the present disclosure may generate the ramp signal by overlapping an input current 21, a sawtooth wave 22 and a DC offset 23. In this case, resistors R4, R5, and R6, and a capacitor C2 may serve to adjust a gain of the gradient of the ramp signal.

Figure 3:
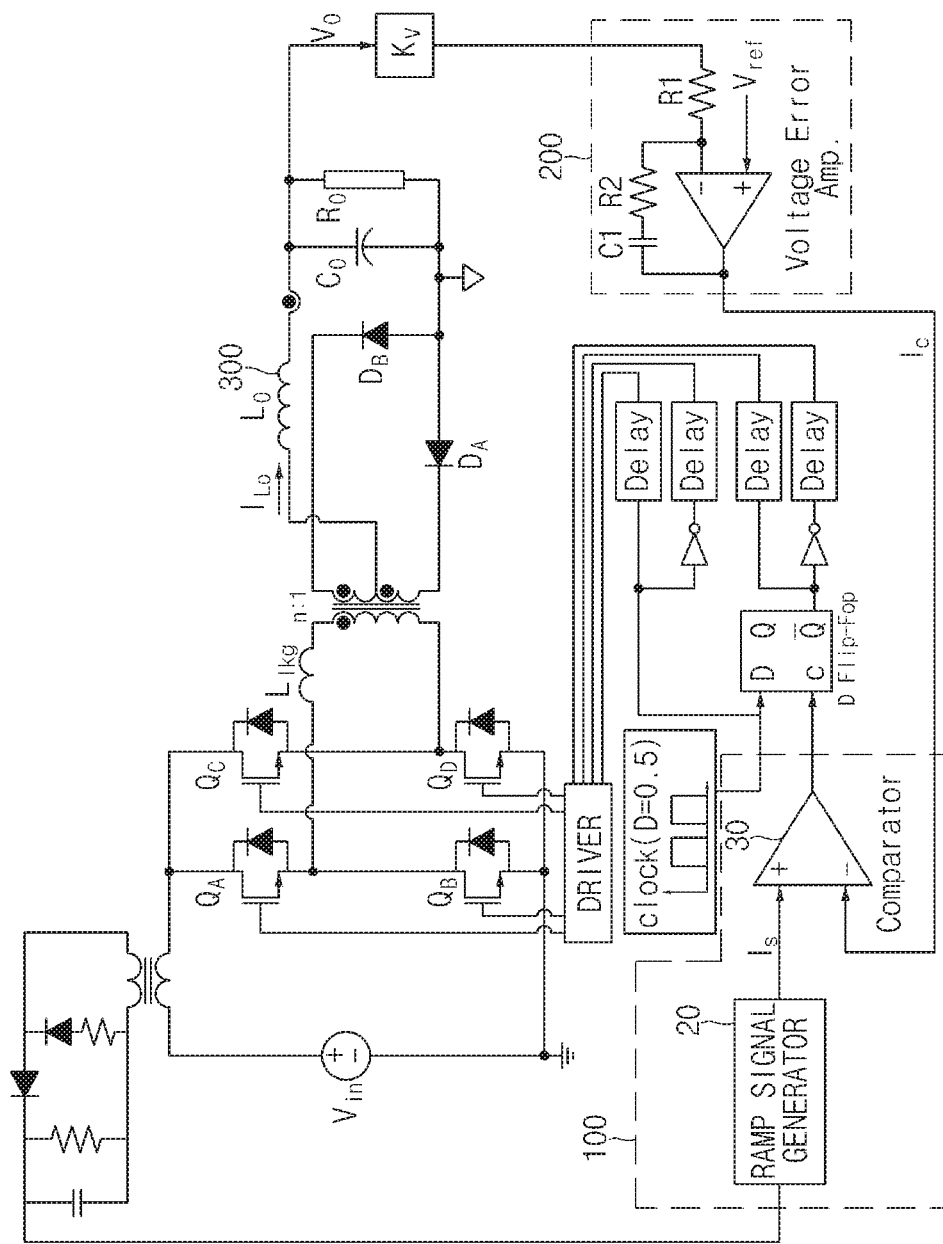
FIG. 3 is a diagram of an LDC to which aspects of the present disclosure are applied in an embodiment of the present disclosure.

FIG. 3 is an illustrative diagram of an LDC to which aspects of the present disclosure are applied.

As illustrated in FIG. 3, the LDC to which aspects of the present disclosure are applied may perform a current control by a converter controller 100 and a voltage control by a voltage controller 200.

The converter controller 100 may generate the PWM signal using the reference current $I_c$ received by the reference current receiver 10, and the ramp signal $I_s$ generated by the ramp signal generator 20, and determine the duty of the generated PWM signal.

Due to a driving condition in which an input voltage of LDC is high, an output voltage (a required voltage) thereof is low, and a load thereof is low, when the LDC outputs a minimum duty, the LDC may enter the current discontinuous mode because a current is low. In the current discontinuous mode, responsiveness may be low as compared to a current continuous mode, and in the case in which the LDC enters a burst mode in which the current reference is decreased to a lowest level or less of the ramp signal and again meets the ramp signal to output the duty, response performance may become slower. In this case, the gradient of the ramp signal may be a factor in determining current control response performance, and in the case in which the gradient of the ramp signal is 0.5 times or more of the gradient of the current flowing in the L0 300, a control signal may not be radiated.

According to the related art, the gradient of the ramp signal may be determined in order to prevent the radiation of a control signal. However, according to the present disclosure, in order to improve control performance in an extremely low load, the gradient of the ramp signal may be dualized into a section of a predetermined duty or less and a section of a predetermined duty or more. As a result, according to the present disclosure, response performance for each of the sections may be satisfied by differently adjusting responsibility for each of the duties.

For example, if control instability occurs in a low duty section in which the current reference $I_c$ is a voltage level of 1.0V (full scale: 4.5V), an increase effect of the current reference $I_c$ for the same duty may be caused by adding the DC offset to the ramp signal, thereby making it possible not to use an unstable driving section in which $I_c$ is 1.0V ($I_c$=1.0V).

If the gradient of the ramp signal is increased in the low duty section, duty variation which is compared to the current reference $I_c$ of 1.0V to be output may be decreased, thereby making it possible to secure control stability. The gradient of the ramp signal may be determined by a combination of the resistors R4, R5, and R6, and the capacitor C2, as illustrated in FIG. 2. The gradient may be varied depending on a capacitance of the capacitor while a charging/discharging of the capacitor C2 is performed at a period of a switching frequency, and the current control response performance may be determined by setting the gradient in a low duty section and slowly setting the gradient in a section of a predetermined duty or more.

FIG. 4 is a diagram illustrating an operation result of an apparatus for controlling a low voltage DC-DC converter for an eco-friendly vehicle according to an exemplary embodiment of the present disclosure.

In FIG. 4, reference numeral '410' denotes the reference current $I_c$, reference numeral '420' denotes a current maximum value of the ramp signal, reference numeral '430' denotes the section in which the duty of the PWM signal is the reference value or less, and reference numeral '440' denotes the section in which the duty of the PWM signal exceeds the reference value.

Therefrom, it may be appreciated that the gradient of the ramp signal in the section of '430' is sharper, or steeper or has a larger slope, than that of the ramp signal in the section of '440'.

As a result, when the current reference $I_c$ is finely varied, a duty variation range in the section of '430' may be smaller than that in the section of '440'. Accordingly, variation of the output voltage may be finely decreased, such that a control is stable.

Figure 5:
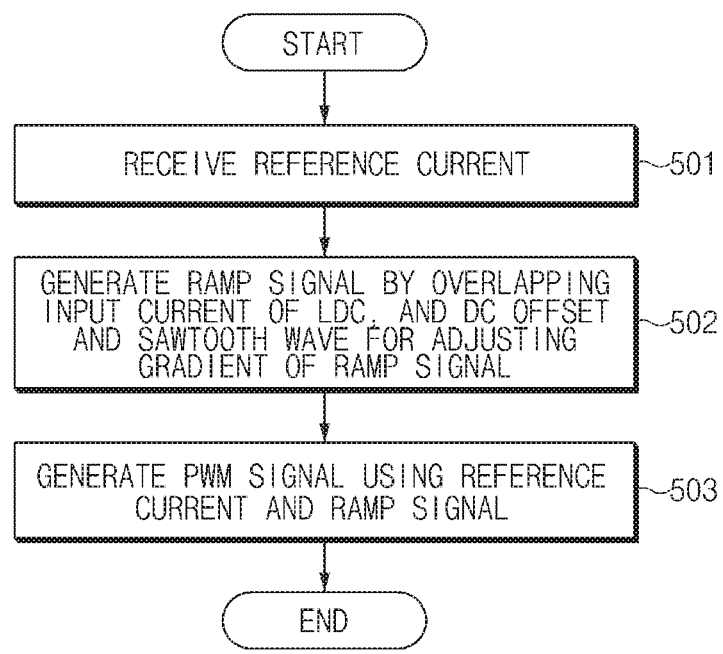
FIG. 5 is a flow chart of a method for controlling a low voltage DC-DC converter (LDC) for an eco-friendly vehicle according to an embodiment of the present disclosure.

FIG. 5 is a flowchart of a method for controlling a low voltage DC-DC converter (LDC) for an eco-friendly vehicle according to an exemplary embodiment of the present disclosure.

First, a reference current receiver 10 may receive a reference current (501).

In addition, a ramp signal generator 20 may generate a ramp signal by overlapping an input current of the LDC, and a DC offset and a sawtooth wave for adjusting a gradient of a ramp signal (502). In this case, the ramp signal generator 20 may generate a ramp signal having a gradient of a first value in a section in which a duty of a PWM signal is a reference value or less, and generate a ramp signal having a gradient of a second value in a section in which the duty of the PWM signal exceeds the reference value.

Thereafter, a comparator 30 may generate the PWM signal using a reference current received by the reference current receiver and the ramp signal generated by the ramp signal generator (503).

The method according to the present disclosure as described above may be created by a computer program. Codes and code segments configuring the computer program may be easily deduced, or implemented or created, by computer programmers skilled in the art. In addition, the created program may be stored in a computer readable recording medium (information storage medium) and may be read and executed by computers, thereby implementing the method according to the present disclosure. In addition, the recording medium includes all types of computer readable recording media.

As described above, according to exemplary embodiments of the present disclosure, the current control response characteristics (control performance) of the LDC may be improved even in the low load environment by sharply adjusting (adjusting the gradient of the ramp signal to the first value) the gradient of the ramp signal used to generate the PWM signal for controlling the LDC of the eco-friendly vehicle in the reference duty or less (the current discontinuous mode), and slowly adjusting (adjusting the gradient of the ramp signal to the second value) the gradient of the ramp signal in more than the reference duty (the current continuous mode).

Further, according to the present disclosure, the ripple value of the output voltage of the LDC may be decreased from 2.35 Vpp to 512 mVpp in the driving condition in which the duty is small.

In the present disclosure, the eco-friendly vehicle, which may be a vehicle being driven by driving an electric motor using a high voltage battery, includes a hybrid electric vehicle (HEV), an electric vehicle (EV), a plug-in hybrid electric vehicle (PHEV), a fuel cell electric vehicle (FCEV), or the like.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a low voltage direct current (DC)-DC converter (LDC) for an eco-friendly vehicle, the apparatus comprising:
 a reference current receiver for receiving a reference current;
 a ramp signal generator for generating a ramp signal by overlapping an input current of the LDC, and a DC offset and a sawtooth wave for adjusting a gradient of the ramp signal; and
 a comparator for generating a pulse width modulation (PWM) signal using the reference current received by the reference current receiver and the ramp signal generated by the ramp signal generator.

2. The apparatus according to claim 1, wherein the ramp signal generator generates the ramp signal having a gradient of a first value in a section in which a duty of the PWM signal is a reference value or less, and generates the ramp signal having a gradient of a second value in a section in which the duty of the PWM signal exceeds the reference value.

3. The apparatus according to claim 2, wherein the first value is greater than the second value.

4. The apparatus according to claim 1, wherein the comparator is a peak current comparator.

5. A method for controlling a low voltage direct current (DC)-DC converter (LDC) for an eco-friendly vehicle, the method comprising:
 receiving, by a reference current receiver, a reference current;
 generating, by a ramp signal generator, a ramp signal by overlapping an input current of the LDC, and a DC offset and a sawtooth wave for adjusting a gradient of the ramp signal; and
 generating, by a comparator, a pulse width modulation (PWM) signal using the reference current received by the reference current receiver and the ramp signal generated by the ramp signal generator.

6. The method according to claim 5, wherein in the step of generating the ramp signal, the ramp signal having a gradient of a first value is generated in a section in which a duty of the PWM signal is a reference value or less, and the ramp signal having a gradient of a second value is generated in a section in which the duty of the PWM signal exceeds the reference value.

7. The method according to claim 6, wherein the first value is greater than the second value.

* * * * *